United States Patent [19]

Smith et al.

[11] Patent Number: 4,678,528

[45] Date of Patent: Jul. 7, 1987

[54] METHOD AND APPARATUS FOR MAKING A PRINTED AND EMBOSSED FLOOR COVERING USING A CAST WEAR LAYER

[75] Inventors: Merrill M. Smith, Morrisville, Pa.; Donald C. Ferguson, Trenton, N.J.

[73] Assignee: American Biltrite, Inc., Wellesley Hills, Mass.

[21] Appl. No.: 708,306

[22] Filed: Mar. 5, 1985

[51] Int. Cl.$^4$ .............. B32B 31/18; B32B 31/22; B32B 31/28; B44C 1/24

[52] U.S. Cl. .................. 156/220; 156/230; 156/231; 156/235; 156/237; 156/240; 156/246; 156/247; 156/249; 156/250; 156/272.2; 156/273.3; 156/380.9; 156/498; 156/499; 156/500; 156/501; 156/510

[58] Field of Search .............. 156/230, 231, 235, 237, 156/240, 220, 277, 246, 247, 249, 384, 390, 499, 500, 501, 510, 250, 272.2, 498, 273.3, 380.9

[56] References Cited

U.S. PATENT DOCUMENTS

| | | | |
|---|---|---|---|
| 3,360,422 | 12/1967 | Desch | 428/251 |
| 3,658,617 | 4/1972 | Fearnow et al. | 156/237 |
| 4,225,374 | 9/1980 | Kaufmann | 156/230 |
| 4,253,896 | 3/1981 | Applegard et al. | 156/231 |
| 4,273,819 | 6/1981 | Schmidle et al. | 156/240 |
| 4,312,686 | 1/1982 | Smith et al. | 156/235 |

FOREIGN PATENT DOCUMENTS 167489  12/1981  Japan .................. 156/220

Primary Examiner—Caleb Weston
Attorney, Agent, or Firm—Pennie & Edmonds

[57] ABSTRACT

An improved process suitable for continuously producing tiles which have the sharp and vivid coloring characteristics of ceramic tiles. In accordance with this process, a release paper is coated with a clear liquid plastisol layer. The clear liquid plastisol layer is given a completely smooth upper surface. A decorative design is then applied to the smooth upper surface by transfer printing. The printed plastisol is then covered with an opaque plastisol backing layer to form a cast wear layer comprising the clear plastisol layer, the printed pattern, and the opaque plastisol backing layer. The cast wear layer is then transferred to a continuous plastic base web that has been made previously so that the backing layer is in contact with the base web. The cast wear layer is laminated onto the base web, and this laminate is embossed using an engraved roll having raised sections which are images of the printed design. The web is cooled, partially annealed, cooled and cut into individual tiles in register with the printed and embossed pattern. Preferably, the cut tiles are then beveled so that only the top plastisol layer is beveled. A urethane no-wax coating is then applied to the beveled tiles. Because the decorative print is transfer printed onto a clear plastisol layer which has a completely smooth surface, all of the print on the transfer print release paper is transferred. This clear print is visible through the clear plastisol layer resulting in tiles that have the sharp and vivid color characteristics of ceramic tiles.

20 Claims, 8 Drawing Figures

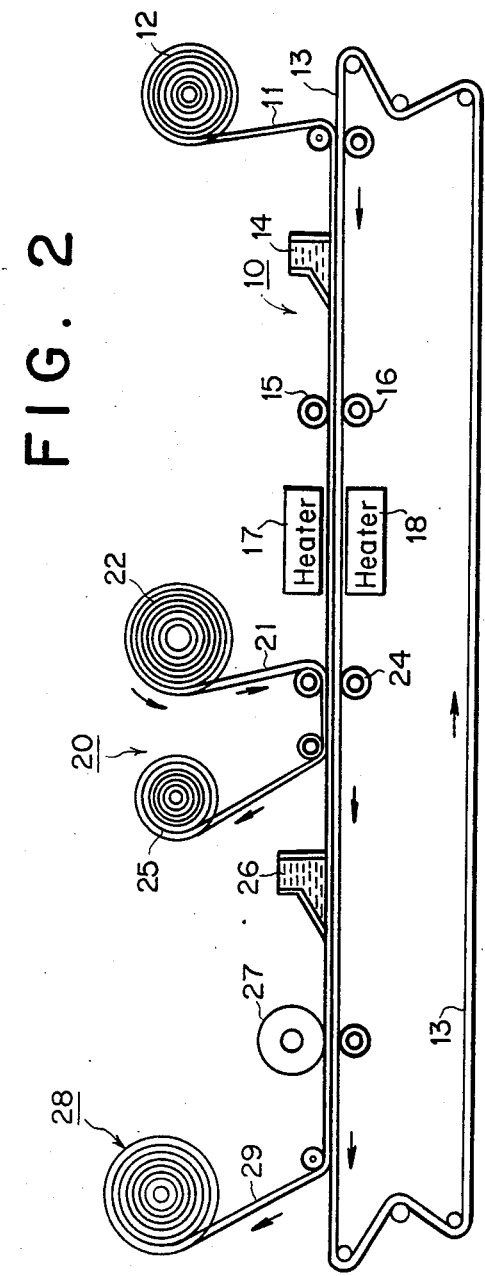
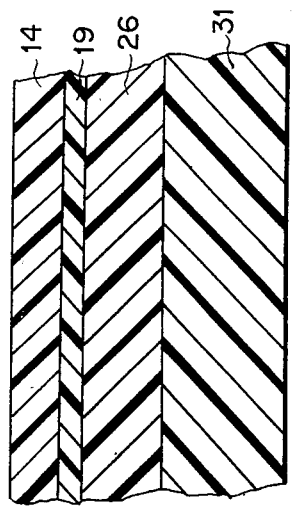
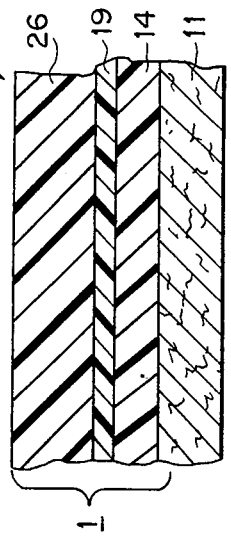

METHOD AND APPARATUS FOR MAKING A PRINTED AND EMBOSSED FLOOR COVERING USING A CAST WEAR LAYER

BACKGROUND OF THE INVENTION

This invention concerns a printed and embossed material, suitable for use as a floor covering, and a method and apparatus for making it in a continuous process. More particularly, it concerns a multilayered material combining a base layer, a printed layer and a wear resistant layer, which is embossed in register with the print.

Reverse printed laminates have been made by laminating separate sheets of calendered base material and a preprinted plastic film. In continuous processes, the printed designs have been limited to random prints because of the difficulty of maintaining the desired dimensions in the preprinted plastic film, in the laminate and in some cases in the base material. The plastic film tends to stretch when it is being printed and subsequently dried. Since it is necessary to apply tension to the printed film during lamination in order to eliminate trapped air and wrinkles, the printed design can also be distorted during lamination.

Alternatively, tiles can be formed in batch processes with designs that are in register to the cut tile by laminating preprinted plastic sheets of silk screen designs on a suitable base material. The tiles can then be hand clicked from the sheets. The high cost of such a batch process makes in-register printed tile quite expensive and limits its acceptance.

An additional complication is imposed by the desirability of providing a textured surface by embossing the tile. Because the embossing step can be another cause of distortion, some processes are limited to embossing of a plastic surface layer that is integral with a nonplastic stable substrate such as asbestos or asphalt-saturated felt.

Alternatively, as described in U.S. Pat. No. 4,312,686, which is incorporated herein by reference, the distortions which occur during printing and laminating are minimized by printing the design on a stable base, preferably release paper, and then transferring the printed design to a hot plastic web made continuously by an extruder. A stress relieved hot plastic film is then laminated to the printed web to provide a protective wear coat. To emboss in register with the printed design, the laminated product is first aligned by means of registration marks that are printed along with the design. Embossing is then made using a conventional engraved roll having raised sections which are images of the printed design. After embossing, the web is partially cooled and annealed. It is then aligned with a die cutter using the same registration marks as used for alignment during embossing. As a result, individual tiles are cut automatically in register to the printed and embossed pattern.

Although the method described in the '686 patent is operative, the method does not, however, result in a vivid and sharp coloring of the tiles which is characteristic of true ceramic tiles. Such a simulation in color characteristics is not possible using the method disclosed in the '686 patent because of the particular method used in applying a decorative design to the tiles. In the '686 patent, a decorative ink design, which has been preprinted on a release paper, is transferred to the base web using transfer rollers which press the preprinted release paper onto the web. However, because the base web is not completely smooth, some of the print on the transfer paper never contacts the base web and remains on the release paper. As a result, the printed designs of the tiles which result from the method of the '686 patent frequently have a grainy appearance so that the coloring of the tile is not brilliant enough to simulate that of a ceramic tile.

In addition, because of the number of operations that are to be performed in the continuous production line disclosed in the '686 patent, a malfunction in any operation will stop the entire production line.

SUMMARY OF THE INVENTION

We have devised an improved process suitable for continuously producing tiles which have the sharp and vivid coloring characteristics of ceramic tiles. In accordance with this process, a release paper is coated with a clear liquid plastisol layer. A completely smooth upper surface is formed in the clear liquid plastisol layer by rollers, a doctor knife, or other methods known in the art. This clear liquid plastisol layer is gelled solid by applying heat. A decorative design is then applied to the gelled, smooth upper surface by transfer printing. Because the surface to which the print is transferred is completely smooth, virtually all of the print is transferred from the release paper to the gelled, plastisol layer resulting in a printed design on the clear plastisol layer with the same sharp and vivid colors as originally on the release paper. The printed plastisol is then covered with an opaque liquid plastisol backing layer which is gelled solid by applying heat. The gelled clear plastisol layer, the printed pattern, and the gelled opaque plastisol backing layer constitute a cast wear layer. The pre-coated release paper, on which the cast wear layer has been deposited, is then rolled up for later use.

When needed, the cast wear layer on the pre-coated release paper is transferred to a continuous plastic base web that has been made previously so that the backing layer is in contact with the base web. The cast wear layer is laminated onto the base web, and this laminate is embossed using a conventional engraved roll having raised sections which are images of the printed design.

Preferably, the cast wear layer is laminated onto the base web by using a heated rotating drum to apply the cast wear layer to the base web and then heating the cast wear layer and web. To prevent the laminated web from adhering to the embossing roll, the roll and the laminated web are cooled with sprays of water which cause the laminated web to set partially at the embossing stage.

As in the '686 patent, distortions are minimized by supporting the plastic web on a belt which is not an integral part of the finished product and alignment is performed by maneuvering the belt.

After embossing, the web is cooled, partially annealed, and cooled. It is then aligned with a die cutter using the same registration marks as used for alignment during embossing. As a result, individual tiles can be cut automatically in register with the printed and embossed pattern. Advantageously, the tiles are cut slightly oversize and are further annealed to shrink them to their proper size.

Preferably, the cut tiles are then beveled so that only the top plastisol layer is beveled. A urethane no-wax coating is then applied to the beveled tiles.

Because the decorative print is transfer printed onto a clear plastisol layer which has a completely smooth surface, all of the print on the transfer print release paper is transferred. This clear print is visible through the clear plastisol layer resulting in tiles that have the sharp and vivid color characteristics of ceramic tiles.

BRIEF DESCRIPTION OF THE DRAWINGS

These and other objects, features and advantages of our invention will be more readily apparent from the following detailed description of a preferred embodiment of the invention in which:

FIG. 2 is a schematic diagram of a preferred embodiment of apparatus used in the practice of our invention for manufacturing the precoated release paper;

FIG. 3 is a cross-section of a pre-coated release paper used in the practice of our invention;

FIG. 5 is a cross-section of a base web after the cast wear layer of the pre-coated release paper has been transferred to it in accordance with our invention;

DESCRIPTION OF THE PREFERRED EMBODIMENTS

FIGS. 1, 2, 4, and 6 illustrate a preferred method and apparatus for practicing our invention to make a solid vinyl tile on which a decorative layer of print has been embossed in register with the print. Portions of this method and apparatus are similar to those described in the '686 patent. Cross-sectional views of the tile at different stages in its manufacture are shown in FIGS. 3, 5, 7 and 8.

Figure 1:
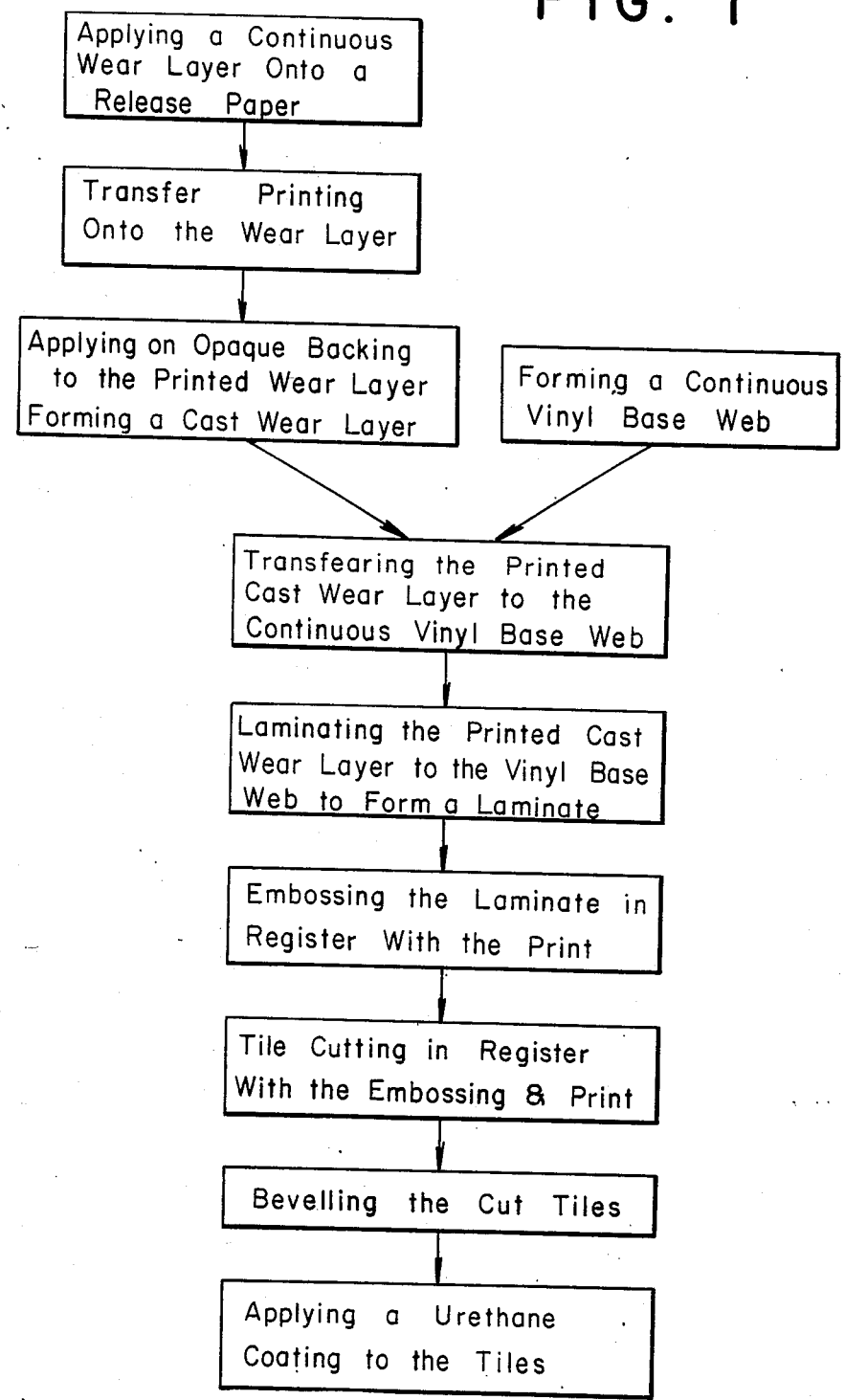
FIG. 1 is a block diagram illustrating the major steps followed in the practice of our invention.

As shown in FIG. 1, the major steps followed in making such a tile comprise: applying a continuous clear plastisol wear layer onto a release paper, transfer printing onto the wear layer, applying an opaque backing to the printed wear layer forming a cast wear layer, forming a continuous vinyl base web, transferring the cast wear layer to the continuous base web, laminating the printed cast wear layer to the base web to form a laminate, embossing the laminate in register with the print, tile cutting in register with the embossing and print, beveling the cut tiles, and applying a urethane coating to the beveled tiles. Preferably, the embossed laminate is partially annealed before cutting, and further annealing is performed on the tiles after they are cut. Infrared heating is used to raise the web and the cast wear layer to appropriate temperatures for embossing and pre-annealing, whereas hot oil is used to heat the laminating drum. Final annealing is accomplished in a hot air oven.

Figure 4:
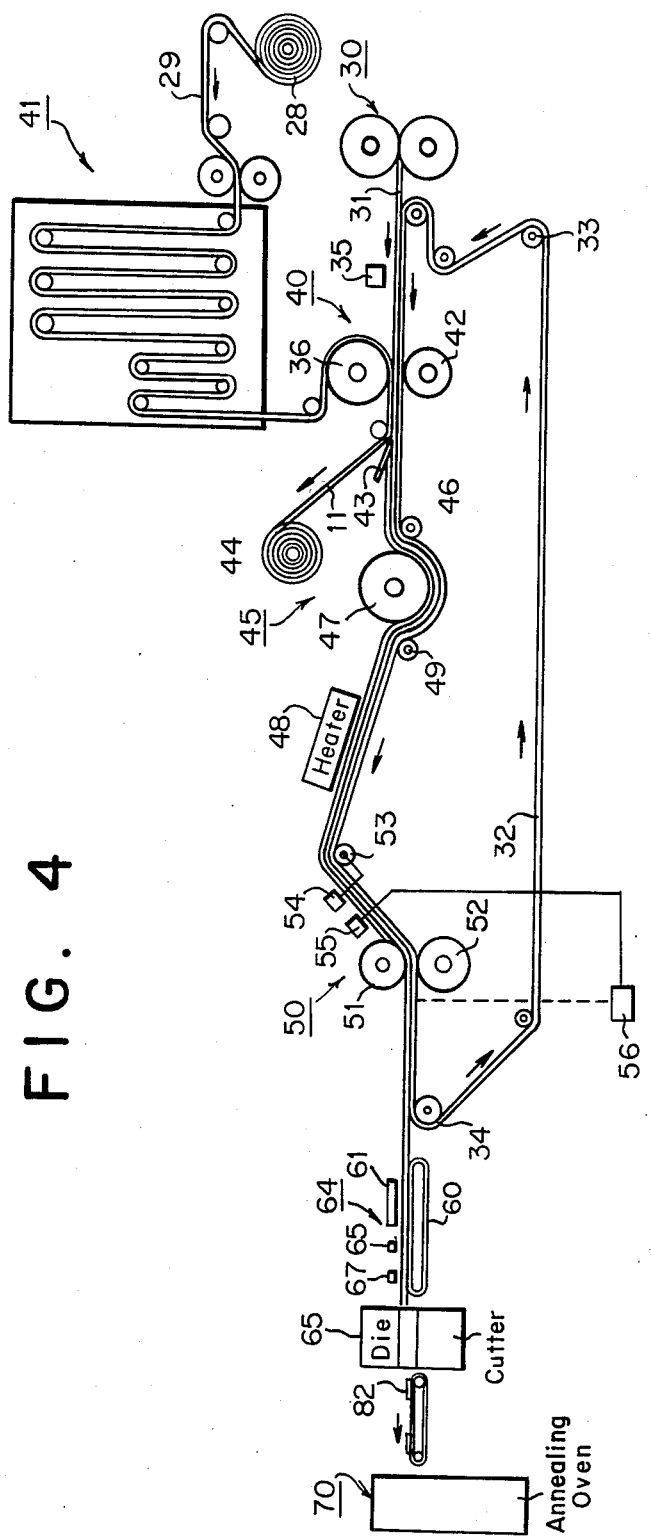
FIG. 4 is a schematic diagram of a preferred embodiment of apparatus used in the practice of our invention for manufacturing tiles.
Figure 6:
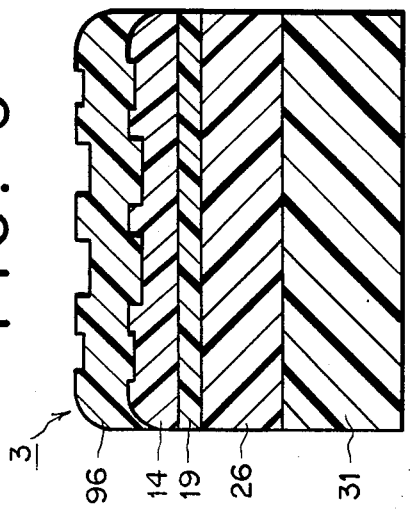
FIG. 6 is a schematic diagram of a preferred embodiment of apparatus used in the practice of the beveling operation of our invention.

Specific apparatus for performing the steps of FIG. 1 is shown in FIGS. 2, 4, and 6. In FIG. 2, a coated release paper is prepared by laying a continuous release paper 11 from a roll of release paper 12 on a carrier belt 13 and then, at a coating station 10, applying a continuous layer of clear liquid plastisol 14 to the release paper 11. The clear plastisol 14 is applied to release paper 11 in its liquid form because it is relatively easy to give the plastisol layer a smooth upper surface in its liquid state. This can be done, for example, by using rollers 15 and 16. Alternatively, a doctor knife, or other methods known in the art may be used. The thickness of clear plastisol 14 is typically 4 mils (0.10 mm.). As it is moved away from coating station 10, the plastisol coated release paper is heated to the temperature required to gel the liquid plastisol solid. A first infrared heater 17 heats plastisol layer 14 directly, and a second infrared heater 18 heats carrier belt 13 which, in turn, heats plastisol layer 14 to a temperature of about 280° F. (138° C.), thereby gelling the plastisol layer.

Next, the web enters a transfer printing station 20 that transfers a layer of print 19 from a preprinted release paper 21 to the smooth surface of plastisol layer 14. For the transfer printing system used in the practice of the preferred embodiment of our invention, this temperature is about 280° F. (138° C.). The print layer 19 can form any kind of design. For high-volume commercial production of tiles, the design is preferably one that permits tiles to be cut with the design centered on the tile so that it is in register with the edges of the tile. Preferably, a vinyl ink is transferred to the clear plastisol, typically with a thickness of about 1-2 mils (0.025-0.05 mm.).

The preprinted paper is fed from a supply roll 22, through transfer rolls 23, 24 to a take up roll 25. In practicing our invention we have found it useful to cool roll 23 to about 70° F. (21° C.) to facilitate transfer printing. To ensure proper alignment of the printed paper in a transverse direction, an edge guidance system (not shown) is used. Moreover, to permit splicing of rolls of preprinted paper, it is preferable to use conventional splicing equipment (not shown) including an unwind roll stand, a splice table and a compensator that allows time to splice the printed design in register.

To transfer the layer of print 19 from release paper 21 to plastisol layer 14, paper 21, coated release paper 11 and carrier belt 13 are fed through the nip formed by rolls 23, 24. Paper 21 is then separated from coated release paper 11. Advantageously a release plate (not shown) can be used at the point of separation of paper 21 from coated release paper 11 and take up roll 25 can be provided with suitable tension control devices. The printed plastisol is then coated with an opaque liquid plastisol backing layer 26 of a thickness of about 8 mils (0.20 mm.) to form a coated release paper 29. Paper 29 is preferably heated under pressure by roll 27 to gel the opaque plastisol layer thereby forming the solid composite which is cast wear layer 1. The cast wear layer 1 typically has a total thickness of about 13-14 mils (0.325-0.35 mm.) as shown in FIG. 3. The coated release paper comprising the printed wear composite and the release paper is then rolled on take up roll 28 for later processing.

A continuous base web of vinyl 31 is prepared as described in the '686 patent by blending its constituents in blenders (not shown) and supplying the mix to a continuous mixer (not shown). Hot plastic from the mixer is continuously supplied to a calender 30 comprising a pair of rolls which produces a hot continuous plastic base web 31. The thickness of this base web is typically about 107 mils (2.72 mm.). The width of the base web is about 14 inches (35 cm.). Other dimensions, however, may be used in the practice of our invention.

As shown in FIG. 4, vinyl base web 31 is fed from calender 30 onto a moving carrier belt 32 which is made of a material such that the web will adhere to the belt when the web is hot, but can be removed from it when the web is cool. Typically, such a carrier belt is made of woven fiberglass impregnated with a silicone elastomer. Carrier belt 32 moves base web 31 through the laminating and embossing stages, supporting the web during these steps. The belt is driven by a drive roll 34 that is driven by means of a conventional line shaft (not shown). To avoid distorting the plastic web and the design printed thereon, the web is guided and aligned by adjusting the carrier belt by means of a guidance system 33. Near calender 30, a loop speed sensor 35 is used to control the speed of the carrier belt so that the plastic web leaves calender 30 at a constant speed.

Base web 31 is fed into transfer station 40 where cast wear layer 1 is transferred from coated release paper 29 to the base web. Release paper 29 is fed from a continuous roll 28 into an accumulator 41 which ensures a constant rate of feed of the release paper into transfer station 40.

At transfer station 40, coated release paper 29 is fed through transfer rolls 36, 42 to a take up roll 44. To transfer the cast wear layer 1 from the paper to base web 31, coated release paper 29, base web 31 and carrier belt 32 are fed through the nip formed by rolls 36 and 42, and release paper 11 is then separated from the cast wear layer. A release plate 43 is used at the point of separation of paper 11 from the cast wear layer, and take up roll 44 can be provided with suitable tension control devices.

The web is next fed into a laminating station 45 where cast wear layer 1 is laminated to web 31. Laminating station 45 comprises a heated rotating drum 47, an upper high intensity infrared heater 48, and rollers 46 and 49. The laminated web is stripped away from rotating drum 47 at roller 49 and passes on carrier belt 32 under heater 48. Infrared heater 48 heats cast wear layer 1, and therefore base web 31. The temperature of web 31 and cast wear layer 1 is raised to approximately 310° F. (154° C.) by infrared heater 48 with the result that cast wear layer 1 is stress relieved and forms a composite 2. A cross-section of composite 2 is shown in FIG. 5. This cross section is not drawn to scale.

Carrier belt 32 then moves composite 2 to an embossing station 50. This station comprises an embossing roll 51, a rubber backup roll 52, and means for transverse and longitudinal positioning of the laminated web (not shown). Embossing roll 51 is an engraved or etched steel or copper roll having areas that are raised above other areas on the roll. Typically the difference in height between the areas averages about 6 to 14 mils (0.15 to 0.35 mm.). Preferably, the raised areas constitute an image of the design that is transfer printed onto the base web. Both the embossing roll and the backup roll are water cooled.

The positioning means includes two electric eyes 54, 55, and a positioning roll 53. Backup roll 52 is driven so that its surface speed is the same as that of drive roll 34. Embossing roll 51 is driven so that its speed is controlled by speed control means 56. The electric eyes sense registration marks which are printed on the web along with the printed design. Electric eye 54 controls positioning roll 53 which guides the composite in the transverse direction so that the raised embossing roll areas are in register with the images on the printed web. Electric eye 55 is connected to speed control 56 and controls the phase of the embossing roll so that the raised embossing roll areas are in register in the longitudinal direction with the printed pattern on the web.

Specific apparatus for producing transverse and longitudinal registration with the embossing roll include a Fife photoelectric line control and a Bobst Champlain registron control, respectively. Numerous other devices will be apparent to those skilled in the art.

The outer surface of embossing roll 51 is cooled directly by a water spray (not shown), and this spray also cools the upper surface of composite 2. The water spray cools and sets composite 2 to such a degree that stretching of the composite by rolls 51 and 52 is minimized. Applying water to roll 51 before composite 2 makes contact reduces the likelihood that the composite will adhere to roll 51. Composite 2 and belt 32 pass through the nip defined by embossing roll 51 and backup roll 52; and the raised areas of the embossing roll form corresponding depressions in composite 2.

After passing through the nip formed by rolls 51 and 52, embossed composite 2 is cooled to a low enough temperature that the embossed composite can be stripped from carrier belt 32. Preferably, this cooling operation is accomplished by immersing composite 2 and carrier belt 32 in a water bath (not shown). This step permits accurate temperature control during all seasons. In practicing the preferred embodiment of our invention, we have found it satisfactory to cool composite 2 to about 80° to 90° F. (27° to 32° C.). Excess water is then removed from the web by a high velocity air knife (not shown); and the embossed composite is stripped from carrier belt 32.

At this point, carrier belt 32 reverses direction. The embossed web, however, moves onto carrier belt 60 which carries it through a pre-annealing station 61 which partially removes the strains imparted by laminating and embossing. After pre-annealing, embossed composite 2 is cooled to about 100° to 110° F. (38° to 43° C.). It then enters a tile cutting station 64 where it is aligned and cut into tiles in register with the pattern printed on the web. Tile cutting station 64 comprises a tile cutter 65, electric eyes 66 and 67, and equipment responsive to signals from the electric eyes for aligning the composite in the transverse and longitudinal directions.

Specific apparatus for aligning embossed composite 2 will be apparent to those skilled in the art from the teaching of Barchi et al.'s U.S. Pat. No. 3,465,384, entitled "Apparatus for Registration of Plastic Web", which is incorporated herein by reference. As disclosed in that patent, a plastic web 6 is fed on a conveyor belt 28 into a tile cutter 36. Photocells 32, 34 are used to maintain the desired transverse position of the plastic web by driving a reversible motor 128 that controls the lateral position of conveyor 28. The photocells sense the lateral position of the plastic web by sensing a continuous longitudinal stripe 92 that is embossed in the plastic web at the same time as a design is embossed in the remainder of the web. In like fashion in the present invention, electric eyes 66, 67 sense registration marks that are printed on embossed composite 2 along with the printed design. Advantageously these registration marks can be the same as those used to align the web at the embossing station. Numerous closed loop feedback systems for control of both lateral and longitudinal position of the web will be apparent.

The tiles 82 are cut so that they are slightly oversize. They are then annealed in an annealing oven 70 at an oven temperature of about 350° F. (177° C.) to shrink them to their proper size. In annealing oven 70, the cut tiles are heated and then slowly cooled in order to obtain the correct size and maintain dimension stability. The tiles are finally further cooled to ambient temperature.

Figure 7:
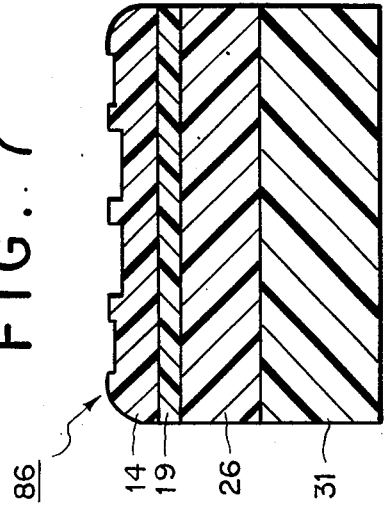
FIG. 7 is a cross-section of the tiles after the tiles have been beveled.

The edges of the cut tiles are optionally beveled, by passing the cut tiles through beveling station 80 shown in FIG. 6. The cut tiles 82 are individually fed onto a moving continuous carrier belt 83 by a tile feeding apparatus 81. Carrier belt 83 is equipped with wedges 84 which prevent cut tiles 82 from moving while their edges are being beveled. Rotary beveling roll 85 bevels the edges of cut tiles 82 so that only clear plastisol layer 14, is beveled, leaving print layer 19 and backing layer 26 intact. Thus, the edges of cut tiles 82 are beveled to a depth less than 4 mils (0.10 mm) which is the thickness of the clear plastisol. The beveled tiles 86 are then removed from conveyor belt 83 and stacked by tile stacker 87. These tiles are then turned 90° and passed through the beveling operation a second time in order to bevel all four tile sides. A cross-section not drawn to scale of beveled tiles 86 is shown in FIG. 7.

Figure 8:
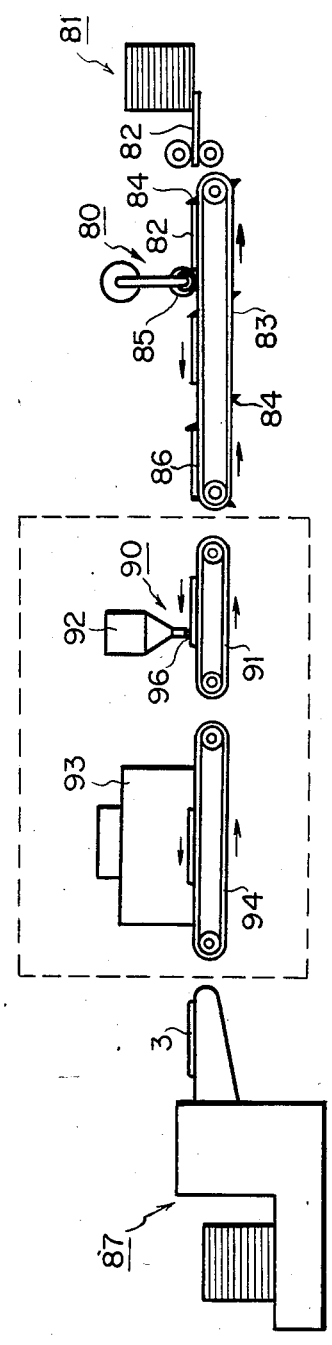
FIG. 8 is a cross-section of the tiles after the no-wax coating has been applied to the tiles.

The cut tiles 86 produced either by the apparatus of FIGS. 4 or 6 optionally pass through a coating station 90 where a urethane no-wax coating layer 96 is applied to the upper surface of the tiles. Coating station 90 is shown in FIG. 6 as immediately following beveling station 80. After beveled tiles 86 pass through beveling station 80, the beveled tiles 86 pass through coating station 90 on a continuous carrier belt 91 where a clear urethane layer 96 is applied by applicator 92 to the beveled clear plastisol layer of the tile. The thickness of the clear urethane layer 96 is typically about 4 mils (0.10 mm.). The urethane layer gives the tile a shiny glaze similar to that of true ceramic tile which does not require waxing to preserve its sheen. The tiles are beveled before urethane layer 96 is applied because beveling a plastisol results in smooth beveled edges while beveling the urethane results in a flaky surface. A cross-section not drawn to scale of the tile 3 after it leaves coating station 90 is shown in FIG. 8. The coated tiles 3 then pass beneath ultra violet lamps 93 on continuous carrier belt 94 where the urethane no-wax layer is cured. The tiles 3 are finally stacked by tile stacker 87 and packaged for shipment.

Suitable formulations for base web 31 and release papers 11 and 21 are set forth in the above referenced '686 patent. Preferably, base web 31 is formed of a vinyl composition comprising a minor portion of plasticized vinyl chloride polymer, and/or vinyl acetate copolymer, containing at least 80% vinyl chloride, uniformly mixed with a major proportion of mineral filler, said minor portion constituting about 16 to 25% by weight of the composition and said major portion constituting about 75 to 84% by weight of the composition.

As will be apparent, many of the individual pieces of apparatus used in practicing our invention are conventional. Heaters, printing stations, laminating stations, embossing stations, die cutting equipment and aligning apparatus are old. However, the combination of this equipment to produce tile that is embossed in register with print on a continuous basis, and transferring a complete printed cast wear layer onto a base web resulting in tiles which have the sharp and vivid color characteristics of ceramic tiles is new.

While the invention has been described in conjunction with specific embodiments, it is evident that numerous alternatives, modifications, and variations will be apparent to those skilled in the art in light of the foregoing description.

What is claimed is:

1. A method of making, on a continuous basis, a composite tile having the sharp and vivid coloring characteristics of ceramic tiles by transferring a printed cast wear layer onto a base web comprising the steps of:
   forming a continuous printed cast wear layer on a release paper comprising the steps of:
      applying a continuous layer of clear liquid plastisol to a continuous moving sheet of release paper;
      forming a smooth surface on said clear liquid plastisol layer;
      gelling said clear liquid plastisol layer;
      transferring a printed design from a preprinted stable carrier sheet to the smooth surface of said clear plastisol layer, said printed design being formed by a material compatible with said clear plastisol layer, said printed design including a first portion which constitutes a decorative design for said composite tile; and
      applying an opaque liquid plastisol backing layer to the printed surface of the clear plastisol layer;
      gelling said opaque liquid plastisol layer; forming a continuous base web on a supported surface traveling in a horizontal direction, said supported surface being made of a material such that the base web will adhere to the surface when the web is hot but can be removed from it when the web is cooled;
   transferring the continuous printed cast layer from the continuous sheet of release paper to the base web; and
   laminating the printed cast wear layer to the base 2. The method of claim 1 wherein said printed design transferred from said preprinted carrier sheet includes a second portion which provides registration indicia for use in manufacturing said composite tile and further comprising the steps of:
   after the base web is laminated, aligning the web by means of the printed registration indicia so that the web is aligned with an embossing roll in both a direction transverse to the direction of travel of the web and a direction that is the same as the direction of travel of the web;
   mechanically embossing the printed cast wear layer with depressions in registration with the printed decorative design;
   cooling the base web;
   stripping the cooled web from the moving surface;
   aligning the web by means of the printed registration indicia so that the web is aligned with a cutting tool in both the direction transverse to the direction of travel of the web and the direction that is the same as the direction of travel of the web;
   cutting the base web into tiles so that the tiles are cut in register with the decorative design; and
   annealing the cut tiles.

3. The method of claim 2 further comprising the step of cooling the web with water prior to mechanical embossing so that stretching of the web by the embossing roll will not occur.

4. The method of claim 2 further comprising the steps of:
   pre-annealing the web after it has been stripped from the moving surface, and
   cooling the pre-annealed web before it is cut.

5. The method of claim 2 wherein the tiles are cut oversized and are shrunken to their proper size during annealing.

6. The method of claim 2 further comprising the step of beveling the edges of the cut tiles after the cut tiles have been annealed.

7. The method of claim 6 further comprising the steps of:
- applying a clear urethane layer to the clear plastisol layer of the cut tiles after the cut tiles have been annealed; and
- curing the clear urethane layer.

8. The method of claim 2 further comprising the steps of:
- applying a clear urethane layer to the clear plastisol layer of the cut tiles after the edges of the cut tiles have been beveled; and
- curing the clear urethane layer.

9. The method of claim 1 wherein said base web is formed from a vinyl composition.

10. The method of claim 1 wherein said base web is formed from a vinyl composition comprising a minor portion of plasticized vinyl chloride polymer, and/or vinyl acetate copolymer, containing at least 80% vinyl chloride, uniformly mixed with a major proportion of mineral filler, said minor portion constituting about 16 to 25% by weight of the composition and said major portion constituting about 75 to 84% by weight of the composition.

11. W Apparatus for making, on a continuous basis, a composite tile having the sharp and vivid coloring characteristics of ceramic tiles by transferring a printed cast wear layer onto a base web comprising:
- means for forming a continuous printed cast wear layer on a release paper comprising:
  - means for applying a continuous layer of clear liquid plastisol to a continuous moving sheet of release paper;
  - means for forming a smooth surface on said clear plastisol layer;
  - means for gelling the continuous layer of clear liquid plastisol;
  - means for transferring a printed design from a pre-printed stable carrier sheet to the smooth surface of said clear plastisol layer, said printed design being formed by a material compatible with said clear plastisol layer, said printed design including a first portion which constitutes a decorative design for the finished product; and
  - means for applying an opaque liquid plastisol backing layer to the printed surface of the clear plastisol layer;
  - means for gelling the continuous layer of opaque liquid plastisol;
- means for forming a continuous base web on a supported surface traveling in a horizontal direction, said supported being made of a material such that the base web will adhere to the surface when the web is hot but can be removed from it when the web is cooled;
- means for transferring the continuous printed cast wear layer from the continuous sheet of release paper to the base web; and
- means for laminating the printed cast wear layer to the base web.

12. The apparatus of claim 11 wherein said base web is formed from a vinyl composition comprising a minor portion of plasticized vinyl chloride polymer and/or vinyl acetate copolymer, containing at least 80% vinyl chloride, uniformly mixed with a major proportion of mineral filler, said minor portion constituting about 16 to 15% by weight of the composition and said major portion constituting about 75 to 84% by weight of the composition.

13. The apparatus of claim 11 wherein said printed design transferred from said pre-printed carrier sheet includes a second portion which provides registration indicia for use in manufacturing said composite tile and further comprising:
- means for aligning the laminated web by means of the printed registration indicia so that the web is aligned with an embossing roll in both a direction transverse to the direction of travel of the web and a direction that is the same as the direction of travel of the web;
- means for mechanically embossing the printed cast wear layer with depressions in registration with the printed decorative design;
- means for cooling the base web;
- means for stripping the cooled web from the moving surface;
- means for aligning the web by means of the printed registration indicia so that the web is aligned with a cutting tool in both the direction transverse to the direction of travel of the web and the direction that is the same as the direction of travel of the web;
- means for cutting the base web into tiles so that the tiles are cut in register with the decorative design; and
- means for annealing the cut tiles.

14. The apparatus of claim 13 further comprising means for cooling the web with water prior to mechanical embossing so that stretching of the web by the embossing roll will not occur.

15. The apparatus of claim 13 further comprising:
- means for pre-annealing the web after it has been stripped from the moving surface, and means for cooling the pre-annealed web before it is cut.

16. The apparatus of claim 13 wherein the tiles are cut oversized and are shrunken to their proper size during annealing.

17. The apparatus of claim 13 further comprising means for beveling the edges of the cut tiles after the cut tiles have been annealed.

18. The apparatus of claim 13 further comprising:
- means for applying a clear urethane layer to the clear plastisol layer of the cut tiles after the cut tiles have been annealed; and
- means for curing the clear urethane layer.

19. The apparatus of claim 17 further comprising:
- means for applying a clear urethane layer to the clear plastisol layer of the cut tiles after the edges of the cut tiles have been beveled; and
- means for exposing the cut tiles to ultraviolet radiation whereby the clear urethane layer is cured.

20. The apparatus of claim 11 wherein said base web is formed from a vinyl composition.

* * * * *